US008881245B2

(12) United States Patent
O'Connor et al.

(10) Patent No.: US 8,881,245 B2
(45) Date of Patent: Nov. 4, 2014

(54) SYSTEM AND METHOD FOR ENHANCING SELF-SERVICE SECURITY APPLICATIONS

(71) Applicant: Avaya Inc., Basking Ridge, NJ (US)

(72) Inventors: Neil O'Connor, Galway (IE); Dara Geary, Galway (IE); Tony McCormack, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/630,137

(22) Filed: Sep. 28, 2012

(65) Prior Publication Data

US 2014/0096196 A1   Apr. 3, 2014

(51) Int. Cl.
*G06F 7/04*      (2006.01)
*G06F 15/16*    (2006.01)
*G06F 17/30*    (2006.01)
*H04L 29/06*    (2006.01)

(52) U.S. Cl.
USPC .......................................................... 726/4

(58) Field of Classification Search
USPC .......................................................... 726/4
See application file for complete search history.

(56) References Cited

U.S. PATENT DOCUMENTS

| 6,934,860 B1 | 8/2005 | Goldstein | |
| 7,552,467 B2* | 6/2009 | Lindsay | 726/5 |
| 8,506,399 B2* | 8/2013 | Pryzby et al. | 463/35 |
| 2003/0159070 A1* | 8/2003 | Mayer et al. | 713/201 |
| 2008/0033641 A1* | 2/2008 | Medalia | 701/209 |
| 2013/0018803 A1* | 1/2013 | Challu | 705/304 |

FOREIGN PATENT DOCUMENTS

EP   2104052 A1   9/2009

OTHER PUBLICATIONS

Extended EP Search Report, European Patent Application No. 13172983.2 dated Feb. 19, 2014, Avaya Inc., 6 pages.
Smartphone Lock (online), Japanese translation (Sep. 25, 2012) and machine translation (Sep. 11, 2014), www.sourcenext.com/product/android/use/a_use_000780/, 9 pages total.
Japanese Office Action dated Jun. 12, 2014, Japanese App. No. 2013-132803, Avaya Inc., 8 pages.

* cited by examiner

*Primary Examiner* — Dant Shaifer Harriman
(74) *Attorney, Agent, or Firm* — Maldjian Law Group LLC; John Maldjian; Alexander D. Walter

(57) ABSTRACT

Embodiments of the present invention may enable a user of an electronic device to setup a game-based environment within the electronic device that can be used as an authentication platform to prevent access by illegitimate or unauthorized users. The communication device may include a display screen, a processor, and a memory coupled to the processor. The memory may include a database and an instruction set. The database may store pre-defined access patterns that can be used in the authentication process. Further, the instruction set may include instructions executable by the processor to monitor inputs made by a new user in the game based environment. Furthermore, the instructions executable by the processor may match the inputs of the new user with the pre-defined access patterns to check the authentication of a new user.

22 Claims, 6 Drawing Sheets

SYSTEM AND METHOD FOR ENHANCING SELF-SERVICE SECURITY APPLICATIONS

BACKGROUND

1. Field of the Invention

Embodiments of the present invention relate to self-service security applications. More specifically, embodiments of the present invention relate to a system and method for the creation of and subsequent authentication of a user's identity via an interactive authentication application.

2. Description of Related Art

Generally, enterprises have data or devices that are required to be protected from unauthorized usage. Therefore, enterprises keep such data and devices protected by using multiple level security systems. The purpose of such security systems is to make it impossible for any intruder to access protected data or device. However, such security systems make it more difficult for a legitimate user to access the protected data or services, unintentionally.

Further, in most online security systems, the protected data is secured by conventional user name and password protection techniques. The user names and passwords may include numeric, alphanumeric, as well as certain special characters. Based on the level of security required, the length of a password is required to be increased in order to make it extremely difficult for any intruder to predict such password. Such techniques have proved efficient in the protection against illegitimate users. However, such techniques make it more difficult for the legitimate clients also to remember such passwords.

Furthermore, in cases of online systems where a high degree of protection is required, the password protection is implemented in levels. For example, a bank may require a primary password for logging into the online bank account and may require a secondary password for the purpose of transactions. Also, some bank accounts even require a third password that is generated and sent by the bank to the mobile device of the user. Therefore, the users of such banks are bound to remember such passwords and are bound to keep their mobile devices near to them during any transactions. This may be hectic and cumbersome for some users. Also it may be hard for many users to remember long and multiple passwords associated with one service.

Another known authentication system is a biometric authentication system. These biometric systems require the users to use their fingerprints, eye retina, facial structure, or voice means to authenticate themselves as legitimate users. However, such authentication systems are expensive to implement and requires high maintenance for correct functioning. Also, these authentication systems can be cheated by professional intruders.

Additionally, all of the aforementioned security or authentication systems are deployed by their associated enterprises. Sometimes, the enterprises develop such complicated security systems that they need to train their users to be able to interact with such security systems. Therefore, many people who do not like to face such a hard time to access their own property, usually utilizes low level security systems that can be breached easily, and hence expose themselves to unnecessary risk.

Therefore, there is a need for improvement in the security systems to make the security systems difficult enough to breach and at the same time simple enough to be accessed by the legitimate users. Further, there is a need for making the security systems more intuitive and user friendly.

SUMMARY

Embodiments in accordance with the present invention provide an authentication system for enabling a user to setup an interactive authentication environment on an electronic device for restricting unauthorized access a service. Further, the system may include a customization module configured to enable the user to customize and setup the interactive authentication environment on the electronic device to access a service. Furthermore, the system may include one or more input mediums for enabling the user to interact with the interactive authentication environment to define one or more access patterns that are required to be imitated in order to gain authentication and to gain post-authentication access to data and applications stored in the user's device or service account. Additionally, the system may include a database to store the user defined access patterns.

In another embodiment of the present invention, there is provided an authentication system for enabling a user to interact with an interactive authentication environment for authentication and for gaining post-authentication access to data and applications stored in the user's device or service account. Further, the system may include one or more input mediums to enable the user to interact with the interactive authentication environment by providing a sequence of inputs. Furthermore, the system may include a monitoring module configured to monitor an input pattern from the sequence of inputs given by the user to the interactive authentication environment. Further, the system may include a decoding module configured to decode an instruction hidden in the input pattern by matching the input pattern with one or more pre-defined access patterns. Additionally, the system may include an execution module configured to execute the decoded instruction hidden in the input pattern received from the user.

In yet another embodiment of the present invention, there is provided a method of deploying an interactive authentication environment on an electronic device as a security application for enabling only legitimate users to gain authentication for accessing user's device or service account and to gain post-authentication access to data and applications stored in the user's device or service account. Further, the method includes enabling a user to interact with the interactive authentication environment by providing an input pattern to gain authentication for the access of the device or service account. Furthermore, the method includes authenticating the user to gain access on a successful match of the input pattern with a pre-defined access pattern. Again further, the method includes enabling the user to interact further with the interactive authentication environment for gaining post-authentication data access by providing a second input pattern. Additionally, the method includes authenticating the user to gain access to a data or application stored in the user's device or service account on successful match of the second input pattern with another pre-defined access pattern.

BRIEF DESCRIPTION OF THE DRAWINGS

The above and still further features and advantages of the present invention will become apparent upon consideration of the following detailed description of embodiments thereof, especially when taken in conjunction with the accompanying drawings, wherein like reference numerals in the various figures are utilized to designate like components, and wherein.

Figure 1:
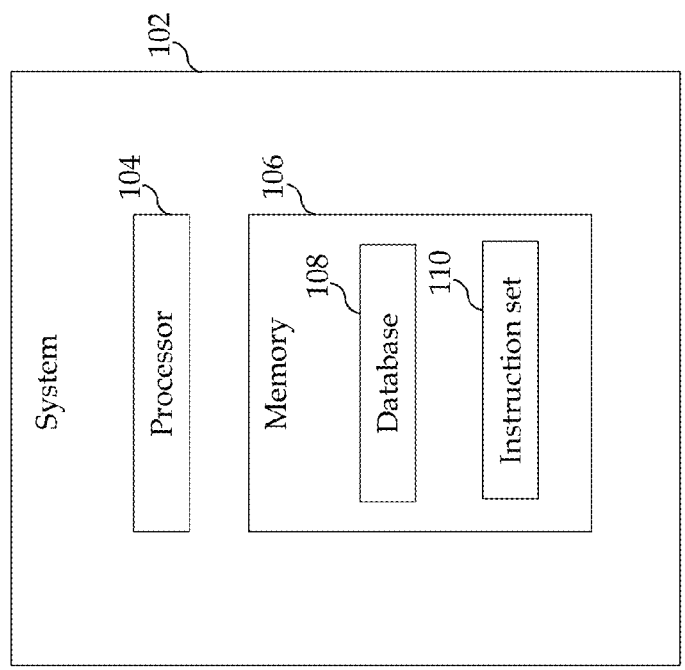
FIG. 1 is an exemplary block diagram of a system for supporting a user to define a personalized mode of authentication for accessing a service, in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

Illustrative embodiments of the present invention will now be described more fully hereinafter with reference to the accompanying drawings, in which some, but not all embodiments of the present invention are shown. Indeed, the present invention may be embodied in many different forms and should not be construed as limited to the embodiments set forth herein; rather, these embodiments are provided so this disclosure will satisfy applicable legal requirements.

FIG. 1 is an exemplary block diagram of a system 102 for supporting a user to define personalized mode of authentication for accessing a service account, in accordance with an embodiment of the present invention. In an embodiment, the system may be implemented as software/firmware that can be installed in any electronic device. In another embodiment, the system may be implemented as a communication device. Examples of communication device may include, but are not limited to, a mobile phone, a smart phone, a Personal Desktop Assistant (PDA), a Tablet, a Personal Computer (PC), a Laptop, a Automated Teller Machine (ATM), and so forth.

The communication device may be used for communication such as data and voice communications over a Public Switched Telephone Network (PSTN), cellular network, the Internet, the Ethernet, and so forth. In an embodiment of the present invention, communication device may include an Operating System (OS) such as, but not limited to, Windows, Windows Mobile, Apple iOS, Google Android, Symbian, Linux, Unix, Macintosh, and so forth. In another embodiment, the communication device may be a basic electronic device with firmware instructions only.

The system 102 includes a processor 104 and a memory 106. The memory 106 includes a database 108 and an instruction set 110. Further, the memory 106 may include a user interface application (not shown) that may be customized/personalized for the user. In an embodiment, the user interface application may be customized by the user. Furthermore, the system 102 may utilize the user interface application for authenticating 'access requests' (requests to access a service account or device) initiated by the user. In an embodiment, the access requests may be initiated by the user in order to access a device, or may be to access a service account, via the device. Further, in the embodiment, the service account accessible via the device may either be a part of the device or may be accessed through a network, either local or enterprise-wide.

The database 108 may store user defined data corresponding to the user interface application stored in the memory 106. In an embodiment, the user defined data may be generated and stored in the database 108 during the customization/personalization process of the user interface application. Further, the user defined data may enable the system 102 to identify the user during a process of authentication. Furthermore, during the process of authentication, the user may provide certain inputs to the user interface application running on a device (implementing the system 102). The system 102 may then match the input received from the user with the user defined data stored in the database 108. Based on the matching, the system 102 may allow/disallow access to the user of the device and/or access to a service account.

Further, the database 108 may include data corresponding to registered users of the system 108. The data may include, but is not restricted to, personal details, professional details, contact information, and pictures of the registered users. On successful authentication, the database may display the stored data corresponding to the authenticated user. Furthermore, the contact information may include name of the contact person, address of the contact person, e-mail address of the contact person, and more.

As shown, the memory 106 includes an instruction set 110. The instruction set 110 is explained, in detail, further in conjunction with embodiments described in FIG. 2 of the present invention. Broadly, the instruction set 110 may include one or more instructions that may be executed by the processor 104 to process/execute various inputs that can be received from the user of the system 102. The inputs received from the user may include certain patterns. The purpose of the patterns may be to identify the user. Every pattern may be pre-registered by the user with the system 102 and may be stored in the database 108 as the user defined data (as explained previously in the FIG. 1). The patterns inputted by the user may support the user in the process of authentication, which may allow the user to access the system, or the service accounts offered by the system 102 or via a network to an enterprise system. Furthermore, subsequent pattern inputs by the user may enable the user to gain post-authentication data access from the system 102 or enterprise service account.

Further, the instruction set 110 may include instructions executable by the processor 104 to enable the user to create the user interface (as explained previously) that can be used as an authentication application in the system itself. In an embodiment of the present invention, the user interface or the authentication application may be an interactive application that requires inputs from the user. In another embodiment, the authentication application may be an image with user-moveable objects on it. The user may move or place the objects on the image in a predefined manner to gain access to the data or services provided by the system. In yet another embodiment, the authentication application may be a game-based application that can be played by the user to provide inputs (as access patterns) to the system for authentication.

Thereafter, the user may install the created user interface at any security check point in the system 102. For example, a user needs to install a self made security check point in his Smartphone that may allow the user to access his Smartphone by unlocking the touch lock or keypad lock, or accessing his service account through the Smartphone, then the system 102 may support the user by providing necessary tools by which the user can create and install a desired type of authentication application (user interface application) at a desired type of security check point (such as keypad unlocking check point of a Smartphone or of the service account).

Furthermore, after installation of the authentication application in the system 102, the instructions stored in the instruction set 110 may enable the user to define an access pattern (user defined pattern) that if inputted in the authentication application, may grant access to the user to access the system, or the service accounts offered by the system. The access pattern may be stored in the database 108 by the system 102. In an embodiment, the user may define multiple access patterns that may be used (by the user) either to authenticate an access request by the user or may be used as a post-authentication data access request by the user.

For example, a user may have private data stored in his Smartphone and thereby may not be willing to allow any other person to gain access to the Smartphone as well as to gain access to the private data. Therefore, the user may create a desired authentication application that may prevent access, to anyone other than the user, to access the Smartphone and the private data stored in it. Further, the user may store an access pattern with the system that can be provided as an input to the created authentication application. During authentication, the user may input the access pattern to the authentication application installed in the system. The system may then match the inputted pattern with the stored access patterns. If the patterns matched, the user may get access to the device, else the access to the device may be denied by the system.

Further, after gaining access to the system, the user may need to provide another input to the authentication application stored in the system 102 to gain access to a particular data stored in the system or to gain access to a service account offered by the system. In an embodiment, the service account offered by the system may require connection to an Internet or Intranet. Therefore, the instructions stored in the instruction set 110 may support the user to pre-define another set of access patterns that may enable the user to avail post-authentication services provided by the system 102.

For example, after successful authentication with the system by the user, the user may input another pattern to the authentication application. The system may again match the inputted pattern with the stored patterns. If the inputted pattern matched with any of the stored pattern, then the system may provide corresponding data or service to the user. Else, the system may declare the user as unauthenticated user or may allow the user to try another set of patterns. In an embodiment, every pattern stored at the system 102 may invoke different functionality of the system for the user. For example, every pattern stored may provide differing levels of access. The user may pre-store as many patterns as needed to gain access and the levels of access to a particular dataset or service account offered by the system 102.

Figure 2:
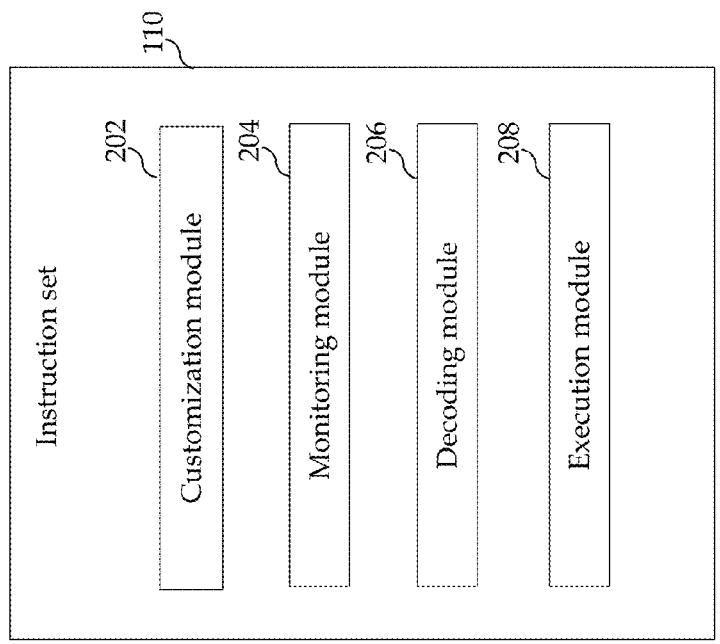
FIG. 2 is an exemplary block diagram of an instruction set for authentication of a user's access to a system and for authentication of the user's post-authentication data or service access requests, in accordance with an embodiment of the present invention.

Furthermore, the functionalities of the instructions stored in the instruction set 110 are explained, in detail, in FIG. 2 of the present invention by dividing the tasks of the various kinds of instructions stored in the instruction set 110 into certain number of modules, for example. It may be appreciated by a person skilled in the art that the number of modules (and their corresponding functionalities) defined in the FIG. 2 of the present invention are not meant for the restriction of the scope of the present invention. The present invention can be implemented by using any number of modules, combinations thereof, or by using no modules at all. The modules used in FIG. 2 are for the purpose of explanation of embodiments of the present invention only. Additionally, it may be appreciated by the person skilled in the art that the functionalities defined above in the FIG. 1 are also not meant as the restrictive aspects of the present invention; rather, the functionalities defined above are meant for the better explanation of the scope of the present invention. Also, the examples used above in the FIG. 1 are only for the purpose of better explanation of embodiments of the present invention and to satisfy the legal requirements for a patent application.

FIG. 2 is an exemplary block diagram of an instruction set, such as instruction set 110, for authentication of a user's access to a system, such as system 102, and for authentication of the user's post-authentication data or service access requests, in accordance with an embodiment of the present invention. The instruction set 110 may include various modules for processing of the inputs provided by the user to authenticate the user and to authenticate the requests made by the user to gain access to the data or services offered by the system 102.

As shown, the instruction set 110 includes a customization module 202, monitoring module 204, decoding module 206, and an execution module 208. In an embodiment, the customization module 202 may enable the user to import a desired game-based environment for customization. The game based environment may be utilized by the user as a medium of authentication. The customization module 202 may enable the user to setup the game based environment as an authentication application in any electronic device that can be implemented as the system 102.

In an embodiment, the user may import the game based environment from any third party resources. In another embodiment, the customization module 202 may enable the user to create a desired game based environment. Further, the game-based environment may refer to as any interactive application that requires user's inputs to perform some functions. The interactive application may either be audio or graphical or a combination of both.

Further, in an exemplary embodiment of the present invention, the user may create the game-based environment as a virtual environment that may be familiar to the user. The purpose of creating the user-familiar environment may be to enhance the security of the system by adding a high degree of personalization (user familiar environment) to the authentication process of the system. This may also alleviate the user from memorizing any kind of passwords (such as textual, vocal, or graphical), as the password required in such user familiar environments will be intuitive-actions of the user in the familiar environment.

Furthermore, during the customizing process of the game-based environment, the user may define and record one or more activity sequences (access patterns) in the environment and may assign a unique function to be performed by the system after completion of every user defined activity sequence. Therefore, the system may perform the assigned activities on completion of any of the pre-defined activity sequences (stored within the system by the user). Additionally, the customization module 202 may enable the user to install/implement the customized environment on any data or service, which the user is willing to protect from other users or intruders.

For example, if a user has an internet banking software application installed in his Smartphone and the user needs to protect that application to be used by any unauthorized person, then the user may either import an authentication game-based environment from a third party source or may create the authentication game-based environment in the Smartphone itself. The authentication game-based environment may include, for example, a seaside resort with no text or digits displayed on it. The environment may be simply a 3D navigable world.

Further, during customizing of the 3D world, the user may provide and record an input sequence in the 3D world by navigating (in the virtual 3D world) up to his favorite beach house, then visiting the $3^{rd}$ palm tree near the beach house, then by turning right towards an ice cream stand, and then by finishing the input sequence by visiting a red boat located in the marina (nearby).

This access pattern may be assigned by the user as an authentication measure at the access of the internet banking software application installed in the Smartphone. Therefore, anyone who tries to access the internet banking application may be flashed with the aforementioned 3D environment for authentication (by repeating the stored input pattern).

Additionally, after storing the first input pattern as an application authentication measure, the user may store another input pattern of further sitting in the red boat to drive the boat via a curved beach up to his headland. Further, the user may assign this activity as an instruction to the Smartphone to send account balance (of associated bank) via a text message. Similarly, the user may create another input pattern in which the user drives the red boat from the marina to a lighthouse. The user may assign this activity as an instruction to the Smartphone to send account mini-statement via the text message or may be via voice output. This way, the user customized the game-based environment to serve as an authentication measure on accessing of the internet banking application.

Additionally, the user customized the game-based environment to serve as a post-authentication means of accessing various features of the internet banking application. In an embodiment, all of the aforementioned customizing processes may be performed by the customization module 202 of the instruction set 110.

Further, the monitoring module 204 may be functional only if a user has already triggered a game based environment (that is implemented as an authenticating measure on access of a service or data) by accessing a protected service or data. After initialization of the game based environment as an authentication checking application, the monitoring module may start communicating with the game based environment. Also, the game based environment may track all input means by which the user may provide input to the system.

The monitoring module may thereby monitor the status of the game based environment and the inputs provided by the user. This may enable the monitoring module to monitor activities performed by the user in the game based environment. In an embodiment, the user may perform activities in the game based environment to authenticate his/her identity as a genuine user of the protected data or service. Therefore, the monitoring module 204 may monitor such activities of the user and may pass the recorded data to the decoding module 206.

The decoding module 206 may decode the monitored data received from the monitoring module 206. In an embodiment, the decoding process may include interpretation of the input received from the user (to perform activities in the game-based environment) as an instruction (hidden in the input pattern) given by the user to either authenticate his/her identity, or to identify an instruction given by the user to perform post-authentication activities. In an embodiment, the decoding module 206 may perform such identification by comparing the input patterns received from the user with the pre-stored access patterns.

In an embodiment, the decoding module may be configured to decode the instructions hidden in the input pattern received from the user, by matching the input pattern with one or more pre-defined access patterns that are stored in the database 108. Further, in an embodiment, the decoding module 206 may be configured to provide certain flexibility in comparison of the input and access patterns. This may facilitate the user by keeping a scope for human errors up to a certain adjustable level. The adjustable level may be defined by the user during customizing process of the game based application.

Further, the decoding module 206 may only be activating by the monitoring module 204. Therefore, the monitoring module 204 may activate the decoding module 206 to decode the input patterns received from a user. The decoding module 206 may then decode the input patterns received from the user to identify if the user has provided any input pattern that is similar to any pre-stored access pattern. In one case, if the decoding module 206 interpreted any input pattern as an access pattern, then the decoding module 206 may activate the execution module 208 to receive the decoded instruction.

The execution module 208 may then analyze if the instruction given by the user (based on the decoded instruction) is valid or not. For example, if a user has accessed the protected internet banking application stored in the Smartphone, and has given an input pattern that is assigned as a post-authentication instruction, then the execution module 208 may not execute the decoded instruction as the user is required to first authenticate his/her identity and then only the user may be enabled to provide instructions to perform further activities with the internet banking application.

Therefore, if the execution module 208 analyzed that the decoded instruction is for authentication, and then the execution module may execute the decoded instruction for authentication to perform tasks required for authenticating the user as a valid user. Thereafter, the execution module may wait for the decoding module to provide decoded instructions to perform post-authentication activities, and thereby the execution module may execute the post authentication instructions (if received from decoding module) to the serve the user.

For example, if a new user has triggered the internet banking application stored in the mobile device, then the user may be flashed with the game-based authentication environment. Thereafter, the monitoring module 204 may get activated to monitor the user's activities. The user may then navigate in the game based environment (as explained in the aforementioned examples) by starting from his/her favorite beach house to visit the third palm tree, and then by turning right at the ice cream stand, and then by finishing at the red boat in the marina.

This activity may be monitored by the monitoring module 204, and may be passed corresponding information to the decoding module 206. The decoding module 206 may decode the information to confirm the activity performed by the user is similar to one of the access patterns stored in the database 108 of the system 102. Thereafter, the decoding module 206 may inform the execution module 208 to perform the activity assigned (pre-assigned by the user during customizing process) to the matched access pattern stored in the database. The execution module may then determine the matched access pattern is for authentication purpose and thereby may start the process of authentication of the user. Thereafter, if the user drives the red boat to the lighthouse, then the monitoring module 204 may again pass the information to the decoding module 206. The decoding module may interpret the activity as similar activity that is pre-stored and then may instruct the execution module 208 to perform the associated assigned activity, and the execution module 208 may then send the mini-statement by SMS to the user.

Figure 3:
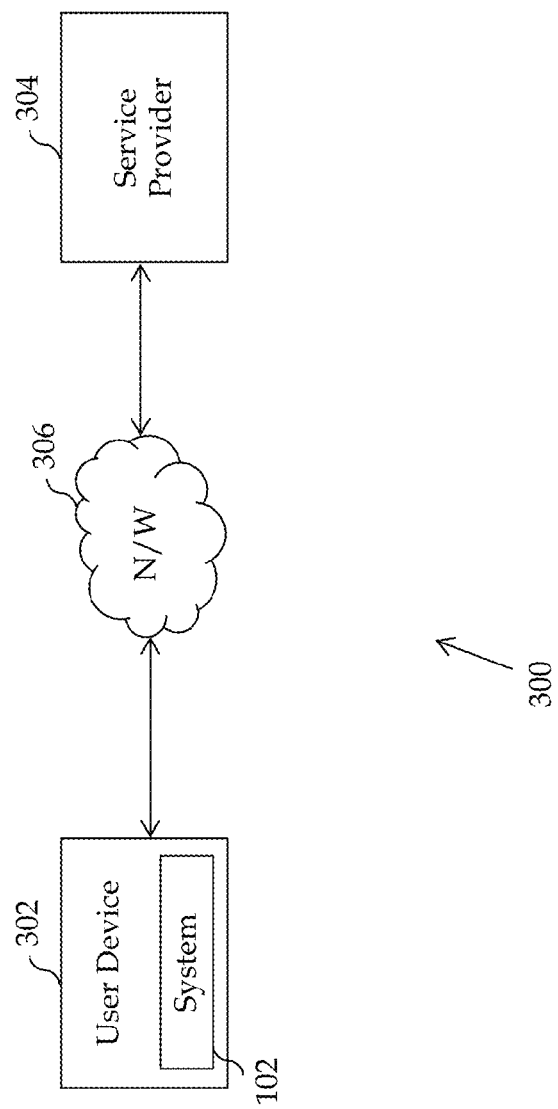
FIG. 3 illustrates an exemplary environment where various embodiments of the present invention may function.

FIG. 3 illustrates an exemplary environment 300 where various embodiments of the present invention may function. As shown, user device 302 of a user is in communication with a service provider 304 via a network 306. Examples of communication device include but are not limited to a mobile phone, a smart phone, a Personal Desktop Assistant (PDA), a tablet, Personal Computer (PC), Automated teller machine, and so forth. Further, the network 306 may include, but is not restricted to, a communication network such as Internet, PSTN, Local Area Network (LAN), Wide Area Network (WAN), Metropolitan Area Network (MAN), and so forth. In an embodiment, the network 106 can be a data network such as the Internet.

Further, the user device 302 may include a system, such as system 102 for providing security to the user device 302 from unauthorized access. The system 102 may facilitate the user of the user device 302 to communicate with the service provider 304 through the network 306. Further, the messages exchanged between the server 102 and the user device 302 can comprise any suitable message format and protocol capable of communicating the information necessary for the service provider 304 to provide a desired service to the user device 302.

In an embodiment, the service provider may be a bank in which the user of the user device 302 has a savings account. Further, the user of the user device 302 may install a software application in the user device 302 via which the user may have an access to perform transaction of money. Therefore, the user may be required to protect any unauthorized use of the software application. The user may either setup a conventional user names and passwords for the access of the software application that may be difficult to memorize, or may use the system 102 to install a game-based environment as an alternative to user name and password protection. In an embodiment of the present invention, the game based environment may be provided by the service provider 304 as a standard game based environment that can be recognized as valid game based authentication environment.

Here, the user may use the system to customize the game based environment in a desired manner and may store the customized environment in the user device 302. Thereafter, the user may define certain access patterns that can be used for authentication and post authentication service purposes. As the game-based authentication environment is recognized by the service provider 304, therefore, the service provider may not implement any security measure for the purpose of authentication of the user, as the user will be authenticated by the game based environment itself.

In an embodiment, the game based environment may include a 3D view of mountains, clouds, and sun in the background and grass, pond, animals in the foreground. Further, the user may store an authentication access pattern of picking a specific animal from the foreground and placing it on the top of a specific mountain in the background. This input (if given by a user) may authenticate the user as a valid user, and the user device 302 may get connected with the service provider 304 via the network 306. Thereafter, the options available with the service provider may be displayed at the 3D environment in labels on certain pre-defined objects.

For example, if the service provider is a bank and the user is authenticated and connected with the bank, then the 3D view may be added with labels of certain banking options, such as balance check, account statement, funds transfer, and mobile recharge etcetera. Every label may be displayed on certain object present in the 3D environment. Therefore, if a label of balance check is on the sun, then the user may need to use the touch screen of the user device 302 to drag and drop the sun before mountains to retrieve balance from the bank. This activity may be pre-stored as post-authentication activity to retrieve balance and hence recognizable by the system also. Similarly, the user may perform other banking options by repeating the pre-stored access patterns to trigger corresponding banking function.

In an exemplary embodiment of the present invention, the user may have restricted access to certain objects present on the 3D environment. This may happen after successful authentication of the user and after establishment of connection of the user device 302 with the service provider 304. This may be because of the restricted access to the authenticated user on his/her bank account. For example, if the authenticated user has not applied for a credit card, then the object having displayed with the name of credit card may be inaccessible by the authenticated user, in the 3D environment.

Further, it may be appreciated by a person skilled in the art that the aforementioned example is not a restrictive aspect of the present invention, and is used only for the better explanation of the present invention. Also, the scope of the service provider 304 is not limited to banks only. The service provider may be an interactive voice response (IVR) system of any organization that may call the user device 302 for some secured information that can only be given to a valid user. Therefore, the user of the user device 302 may use the game based environment to authenticate his/her identity for accessing secured information from the IVR system. Similarly other embodiments are also possible, where a high level or multiple levels of security is/are required.

Figure 4:
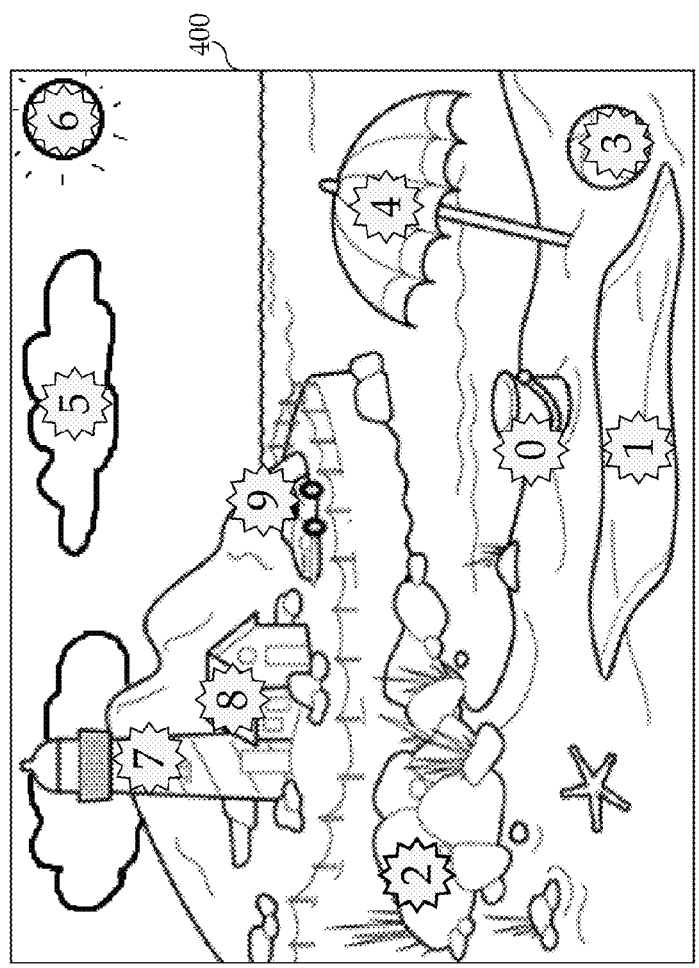
FIG. 4 is an illustration of the game based authentication environment for enabling a user to authenticate and navigate with an interactive voice response (IVR) system, in accordance with an embodiment of the present invention.

FIG. 4 is an illustration of the game based authentication environment 400 for enabling a user to authenticate and navigate with a service system, e.g, a bank, or an IVR system, in accordance with an embodiment of the present invention. In an embodiment, the user may use the game based environment 400 as a support for authentication during, e.g., IVR calls or any other calls. For example, if a user needs to authenticate his/her identification, then the user may use the game based environment 400, to provide inputs required by the IVR system. Furthermore, during the call, if the user needs to go deeper into IVR menu options, then the user may again use the game based environment 400 to provide the inputs required by the IVR system.

As shown, for example, the game based authentication environment 400 is digitized scenery. The digitized scenery includes many digitized objects, such as, but are not restricted to, clouds, sun, house, lighthouse, stones, ball, mat, umbrella, car etcetera. In an embodiment, these objects can be touched (selected as input) by using a touch screen device. In another embodiment, the objects may be moveable objects (i.e. whose position on the scenery can be changed) and therefore may be rearranged by the user (to provide an input pattern) by using a touch sensitive device. In yet another embodiment, the objects may be displayed with label numbers (as shown in FIG. 4). The user may use a touch screen to touch those objects or corresponding labels to provide inputs to the game-based authentication environment 400, or may use a keypad (in case of non-touch devices) to select an object by pressing its corresponding key. The objects and/or numbers may be visible to the user at all times or may be visible to the user at the first set up stage and then subsequently hidden during future authentication and verification sessions.

Further, in an exemplary embodiment of the present invention, the user may call an IVR system of his/her bank. The network service provider may ask the user to authenticate him/her self by entering personal identification number (PIN). The user may then enter his/her PIN number by selecting/touching the objects or numbers embedded on the objects displayed on the screen. For example, if PIN of the user is 9717, then the user may select the objects in the game based environment 400 in the following sequence: car, lighthouse, cloth, and lighthouse. In an embodiment, as described above, the user may have an option to switch on or off the display of the embedded numbers on top of the digitized objects for this purpose. The user may memorize the sequence that the user entered while entering the PIN, i.e., the sequence of selecting a car first followed by selection of the lighthouse, then cloth and then lighthouse again. Therefore, the user may switch off the display of the embedded numbers and may always input the memorized sequence that will act as a valid input for the bank.

Furthermore, post-authentication, the IVR system may ask the user to press '1' to know account balance, press '2' to for mini-statement, etc. The user may then touch/select cloth to know his/her account balance. Similarly, the user can navigate deeper into IVR system by selecting desired choices via the game based environment 400. In another embodiment, the user may again memorize the post-authentication choices and may enter all the inputs at a time to directly navigate to desired service, such as to retrieve his account balance by directly entering an input sequence: car, lighthouse, cloth, lighthouse, and cloth.

In another embodiment of the present invention, the gaming environment 400 may not show any numbers embedded on any digitized object of the scenery. The user may need to pre-register with the bank to store one or more access patterns for authentication and post-authentication services or data access. Therefore, in order to authenticate, the user may always need to touch the objects in the scenery in the following sequence: car, lighthouse, cloth, and lighthouse. Further, the positions of the objects of the scenery may be random and every time when the user communicates with the game based environment, the position of the clouds, lighthouse, sun, ball, and cloth etcetera may be changed. However, the sequence or access pattern stored with the bank will remain same and the user may need to find the positions of the object in the scenery to enter the same sequence as of the access pattern, i.e. car, lighthouse, cloth, and lighthouse. This may enable the user to intuitively recognize his/her password and will make it very hard for an intruder to crack the pattern.

It will be appreciated by the person skilled in the art that the environment 400 as shown in the figure is just for the better explanation of the present invention. The scope of the present invention is not restricted to scenery only. The game based environment may include any game type including two dimensional games, three dimensional games, or any other interactive environment such as puzzles, piano play etcetera. For example, the user may play his or her favorite song on a piano, or at least a few bars of the song, to gain access and authenticate him or herself.

Further, embedding of the numbers on the digital and moveable objects is just an embodiment of the present invention and does not cover full scope of the present invention. The game based environments may or may not include any object embedded visible numbers. Also, the game based environment may be displayed randomly and the user may have to input their pre-stored sequences accordingly.

In another embodiment of the present invention, the gaming interface is furthermore used as a conduit from the Self Service realm to the Assisted Service realm. For example, having authenticated, if the user approaches a group of people within the game environment, this can be inferred as a request for assistance. "Assisted Service" can optionally follow Self-Service, and refers to the involvement of a human agent in the interaction with the user.

By using visual characteristics, other visible game characters could advertise skills that can be "visited" by the user, including the ability to combine objects by way of a sequence of movements made by the user. For example, by the user visiting the Eiffel Tower and then a nurse, the user would be in need of French-speaking medical advice.

In a further embodiment, game play estate is exclusively extended for users of higher value to the enterprise. For example, groups of agents could be made available or "visible" at certain locations that are only accessible to certain users.

Embodiments of the present invention also relate to how the context of the Self-Service interaction can be used to select a suitably skilled human agent.

Figure 5:
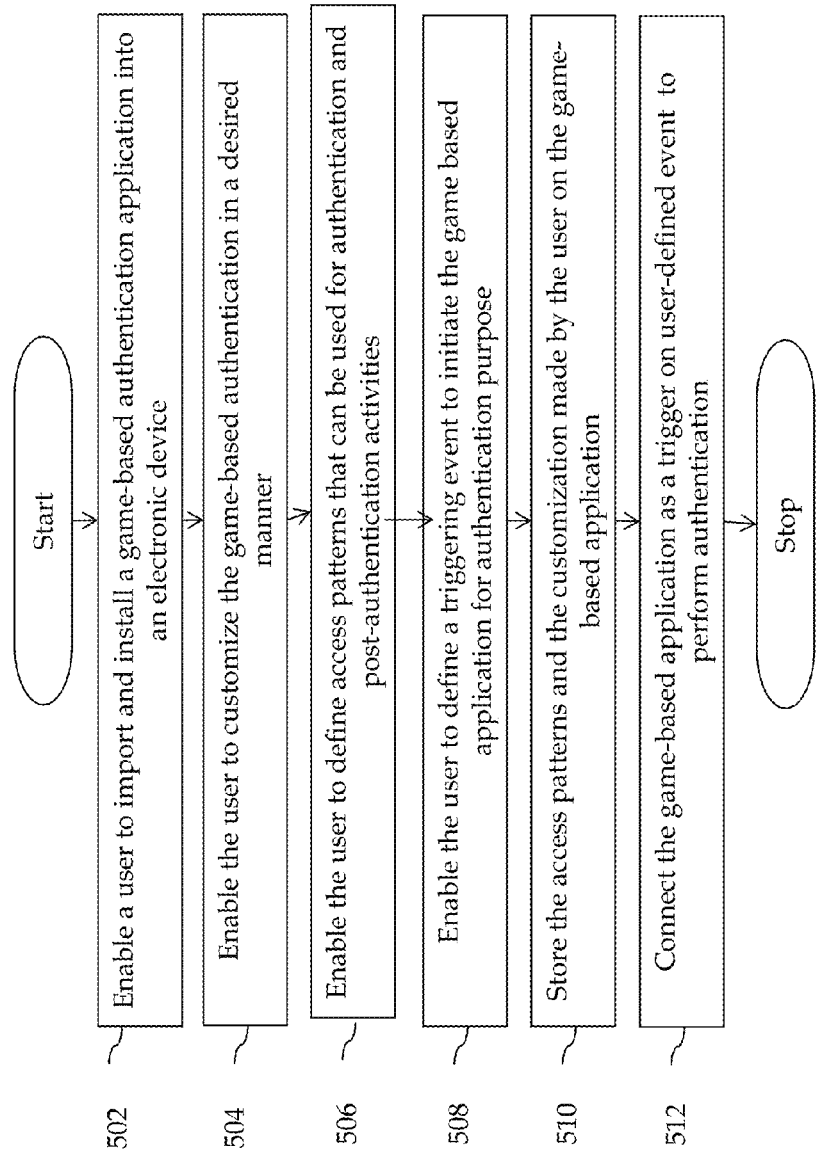
FIG. 5 is a flow diagram of a method to customize and setup a game based authentication application on an electronic device, in accordance with an embodiment of the present invention.

FIG. 5 is a flow diagram of a method to customize and setup a game based authentication application on an electronic device, in accordance with an embodiment of the present invention. In an embodiment, the flow diagram represents functionalities of the customization module 202 (as defined previously in FIG. 2 of the present invention). Further, the method may be understood more clearly when, the description corresponding to the method, is read in conjunction with FIGS. 1, 2, 3 and 4. The order in which the method is performed is not intended to be construed as a limitation, and further any number of the method steps may be combined in order to implement the method or an alternative method without departing from the scope of the present invention.

At step 502, a user of an electronic device may import a game based authentication environment from a third party source, or may create the environment on the device itself. The game based authentication environment may enable the user to prevent unauthorized access to the electronic device, or unauthorized access to any data or service option stored in the electronic device or to a service provider's enterprise system such as an IVR system. Thereafter, the user may install the game based environment in the electronic device for the purpose of customization of the environment.

At step 504, the user may customize the game based environment in such a manner that the environment becomes familiar to the user. The environment may either resemble the place where the user lived in childhood, or may resemble some imagination or dream of the user, or may resemble a favorite movie scene or life event of the user. This may add high level of personalization and thus security to the environment as such environments may not be recognized by any other user.

At step 506, the user may record a sequence of input given to the game based environment that may modify the look and feel of the environment, or may change the state of the environment in a manner desired by the user. The user may then store the recorded input sequence as an access pattern that can be used for the authentication of a user who tries to access the electronic device. Further, the user may provide one or more of such (but different) input sequences to be stored as access patterns that can be used to perform some task on the electronic device, as post-authentication activities.

At step 508, the user may determine an event on which the user needs to activate the game-based authentication environment for authentication of the user who initiated the event. The event may either be to switch on the electronic device, or may be to access some data stored in the electronic device, or may be to access a service provided by the electronic device or by an enterprise service provider. Therefore, if a user initiates any event at which the trigger is implemented, then the user who initiated the event will encounter first with the game based environment so the identity of the user may first be confirmed before allowing the user to access the initiated event.

At step 510, the user may make final customization changes to the game based environment and then can finish the process of customization by connecting the game based environment with the triggering event, which was determined at the step 508. Therefore, the setup of the game-based authentication environment at any event of the electronic device is completed and is ready to be used. In an embodiment, the user may test the setup by trying to trigger the event and to check if the game based environment gets activated. This way the user can be sure of the security from unauthorized access to the electronic device, its data or the user's date embedded in an enterprise service database.

Figure 6:
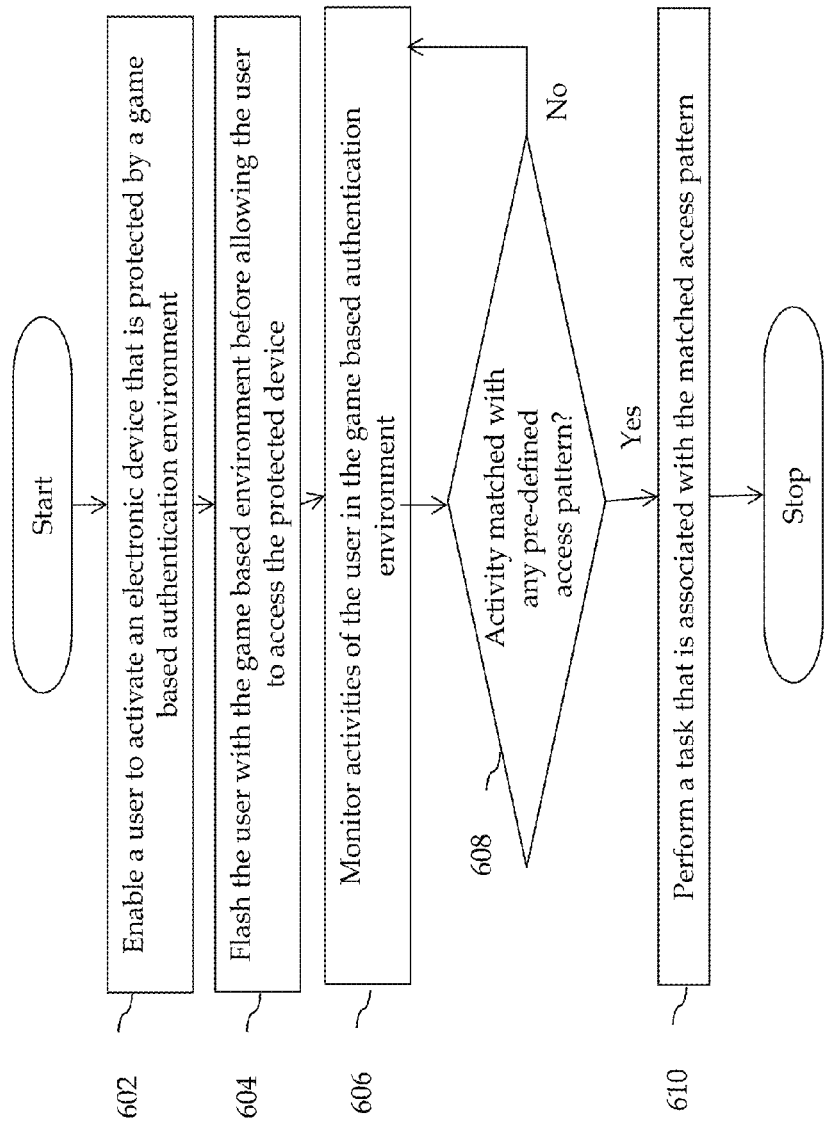
FIG. 6 is a flow diagram of a method to authenticate a user by using a game based authentication module, in accordance with an embodiment of the present invention.

FIG. 6 is a flow diagram of a method to authenticate a user by using a game based authentication module, in accordance with an embodiment of the present invention. The method may be understood more clearly when the description corresponding to the method is read in conjunction with FIGS. 1, 2, 3, 4 and 5. The order in which the method is performed is not intended to be construed as limitation, and further any number of the method steps may be combined in order to implement the method or an alternative method without departing from the scope of the present invention.

At step 602, a user may try to activate an electronic device or the data contained therein or an enterprise service data base or account of the user via an IVR system or otherwise (collectively "access points"). In an embodiment, the electronic device may be implemented as the system 102. In another embodiment, the system 102 may be implemented as a part of the electronic device. In yet another embodiment, the system 102 may be installed as firmware/software in the electronic device. Further, the electronic device may be protected by a game based authentication application that may not allow the user to access the electronic device until the user successfully enters an input pattern that matches with a pattern that is pre-defined.

Therefore, at step 604, after activation of the electronic device, the game based environment may be loaded on the electronic device and the user may have to pass through the environment to get access to the electronic device or other access points mentioned above. Further, after loading of the game based authentication environment on the electronic device, at step 606, the electronic device may start monitoring all the input means of the electronic device to record user inputs that the user may use to interact with the game based environment. This step (i.e. step 606) may be performed by the monitoring module 204 (as described earlier in FIG. 2 of the present invention).

Further, at step 608, the electronic device may start matching the monitored user inputs (activities of the user) with the pre-defined patterns stored in the electronic device. If the monitored user inputs matched with any of the pre-stored pattern, then the method may proceed forward to step 610, else the method may start again from step 606, where the electronic device keeps monitoring the inputs provided by the user to interact with the game-based authentication application. In an embodiment, this step (step 608) may be performed by the decoding module 206 (as described earlier in FIG. 2 of the present invention).

At step 610, the electronic device may perform a task that may be associated with the identified access pattern. For example, if at step 608, it is determined an input pattern provided by the user matches with an access pattern that is associated with the authentication of the user, then at step 610, the user may be authenticated. Further, if at step 608, it is determined a second input pattern provided by the user matches with an access pattern that is associated with an instruction to retrieve account balance, then at step 610, the account balance of the associated bank account may be retrieved and displayed to the user suitably.

In an embodiment, the second input pattern (received as post-authentication data access request) may include lesser number of inputs/input-sequences in comparison with the input pattern received from the user for the purpose of authentication only. This may provide an ease to the user during post-authentication data access. Therefore, at step 610, the actual task that is aimed by a valid user is performed by the electronic device. In an embodiment, the step 610 may be performed by the execution module 208 (as described earlier in FIG. 2 of the present invention).

Further, the method is not restricted to the above information as mentioned herein. The various embodiments, that are explained in FIGS. 1-5, may be utilized by each of the methods as explained here above. Further, the present invention is not limited to the above-mentioned embodiments and examples and many other embodiments and examples may be implemented in light of the present invention without departing from the scope of the present invention.

Furthermore, it may be appreciated by a person skilled in the art that the device, system and method, corresponding to the present invention, provides more intuitive, user friendly, and consistent means of authentication for a valid user of an electronic device. Also, the present invention provides post-authentication means for accessing data or services offered by the electronic device. These functionalities and features of the present invention are not restricted to the above mentioned description. Various embodiments (not restricted to the above description) may be implemented in light of the scope of the present invention.

Advantageously, the present invention provides a system, a method and a device as an alternative solution for the cumbersome system of user name and password-secured applications and services. The present invention may enhance the experience of a user who is willing to protect any data or service from unauthorized access. Further, the present invention may add fun for young children or adults in managing secured transactions. Furthermore, the present invention may provide an escape for elder people to remember user name and passwords. Additionally, the present invention may improve the level of security in the authentication systems without increasing hurdles for the legitimate users.

Further, the present invention describes how users who wish to legitimately access data within an enterprise can securely do so using an interface of their own preference and creation. Furthermore, the present invention enables the users to interact with the self-defined game-based authentication platforms in a highly intuitive and flexible manner. Again further, the present invention enables the users to interact in a way that renders identity theft more difficult due to the high degree of personalization involved in all discrete steps/interactions.

It may be appreciated by a person skilled in the art the present invention is not limited to the advantages as mentioned here above. Further, many other advantages may be understood in light of the description given above without departing from the scope of the present invention. Embodiments of the present invention are described above with reference to block diagrams and schematic illustrations of methods and systems according to embodiments of the present invention. It may be understood that each block of the diagrams and combinations of blocks in the diagrams can be implemented by computer program instructions. These computer program instructions may be loaded onto one or more general purpose computers, special purpose computers, or other programmable data processing translators to produce machines, such that the instructions that execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the present invention has been described in connection with what are presently considered to be the most practical and various embodiments, it is to be understood that the present invention is not to be limited to the disclosed embodiments, but on the contrary, is intended to cover various modifications and equivalent arrangements included within the spirit and scope of the appended claims. The present invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the present invention may be practiced with other computer system configurations, including hand-held devices, multiprocessor systems, microprocessor-based or programmable consumer electronics, network PCs, minicomputers, mainframe computers, and the like. Further, the present invention may also be practiced in distributed computing worlds where tasks are performed by remote processing devices that are linked through a communications network. In a distributed computing world, program modules may be located in both local and remote memory storage devices.

This written description uses examples to disclose the present invention, including the best mode, and also to enable any person skilled in the art to practice the present invention, including making and using any devices or systems and performing any incorporated methods. The patentable scope of the present invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An authentication system configured to enable a user to setup an interactive authentication environment on an electronic device for restricting unauthorized access, the system comprising:
   a customization module configured to enable the user to customize and setup the interactive authentication environment on the electronic device;
   one or more input mediums configured to enable the user to actively interact with the interactive authentication environment to define one or more access patterns within a three-dimensional virtual environment that are required to be imitated in order to gain authentication and to gain post-authentication access; and
   a database to store the defined access patterns,
   wherein the interactive authentication environment comprises a game-based three-dimensional virtual environment.

2. The system of claim 1, wherein the three-dimensional virtual environment is a navigable virtual environment.

3. The system of claim 1, wherein the interactive authentication environment includes a foreground, a background, and moveable objects.

4. The system of claim 1, wherein the electronic device may enable the user to connect to a service via a network after gaining authentication.

5. The system of claim 4, wherein the electronic device may enable the user to connect to the service via an IVR system.

6. The system of claim 5, wherein the electronic device may enable the user to transfer from the IVR system to an assisted service system.

7. The system of claim 1, wherein the input means includes a touch sensitive screen of the electronic device.

8. An authentication system configured to enable a user to actively interact with an interactive authentication environment for authentication and for gaining post-authentication access to data and applications, the system comprising:
   one or more input mediums to enable the user to actively interact with the interactive authentication environment by providing a sequence of inputs, wherein the interactive authentication environment comprises a game-based three-dimensional virtual environment;
   a monitoring module configured to monitor an input pattern from the sequence of inputs given by the user to the interactive authentication environment;
   a decoding module configured to decode an instruction hidden in the input pattern by matching the input pattern with one or more pre-defined access patterns that had been defined within a three-dimensional virtual environment; and
   an execution module configured to execute the decoded instruction hidden in the input pattern received from the user.

9. The system of claim 8, wherein the three-dimensional virtual environment is a navigable virtual environment.

10. The system of claim 8, wherein the interactive authentication environment includes a foreground, a background, and moveable objects.

11. The system of claim 8, wherein the electronic device may enable the user to connect to a service via a network after gaining authentication.

12. The system of claim 8, wherein the input means includes a touch sensitive screen of the electronic device.

13. A method of deploying an interactive authentication environment on an electronic device as a security application for enabling only legitimate users to gain authentication for accessing the electronic device and to gain post-authentication access to data and applications stored in the electronic device or in an enterprise database, the method comprising:
   enabling a user to actively interact with the interactive authentication environment by providing an input pattern to gain authentication for access, wherein the interactive authentication environment comprises a game-based three-dimensional virtual environment;
   authenticating the user to gain access on successful match of the input pattern with a pre-defined access pattern that had been defined within a three-dimensional virtual environment;
   enable the user to actively interact further with the interactive authentication environment for gaining post-authentication data access by providing a second input pattern; and
   authenticating the user to gain access to data or an application on successful match of the second input pattern with another pre-defined access pattern that had been defined within a three-dimensional virtual environment.

14. The method of claim 13, wherein enabling a user to interact with the interactive authentication environment includes enabling the user to interact via a touch sensitive screen of the electronic device with the interactive authentication environment.

15. The method of claim 13, wherein the deploying of the interactive authentication environment includes customization and installation of the interactive authentication environment at the electronic device.

16. The method of claim 15, wherein the installation of the interactive authentication environment includes connection of the interactive authentication environment to a triggering event.

17. The method of claim 13, wherein the second input pattern for post-authentication data access has lesser number of inputs in comparison with the input pattern received from the user to gain authentication for access.

18. The method of claim 13, wherein the applications stored in the electronic device may enable the user to connect to one or more service providers via a network for access to an enterprise system.

19. The method of claim 16, wherein the triggering event comprises interfacing with an IVR system of the enterprise to access enterprise data of the user.

20. The method of claim 19, wherein after accessing the IVR system, upon a second triggering event, the user is transferred to an assisted service system of the enterprise.

21. The method of claim 20, wherein the transferring step comprises pre-qualification of an agent within the assisted service system that matches the user's assistance needs or status.

22. The method of claim 21, wherein the second authentication step comprises revealing certain high value agents to the user if the user's status is at a pre-determined level.

* * * * *